Oct. 4, 1966  G. P. McALEER ETAL  3,276,096
MATERIAL SLITTING AND EXPANDING MACHINE
Filed Nov. 25, 1964  3 Sheets-Sheet 1

INVENTORS
G. P. McALEER, T. A. SCHMIDT
BY
Erwin G. Yaeger
ATTORNEY

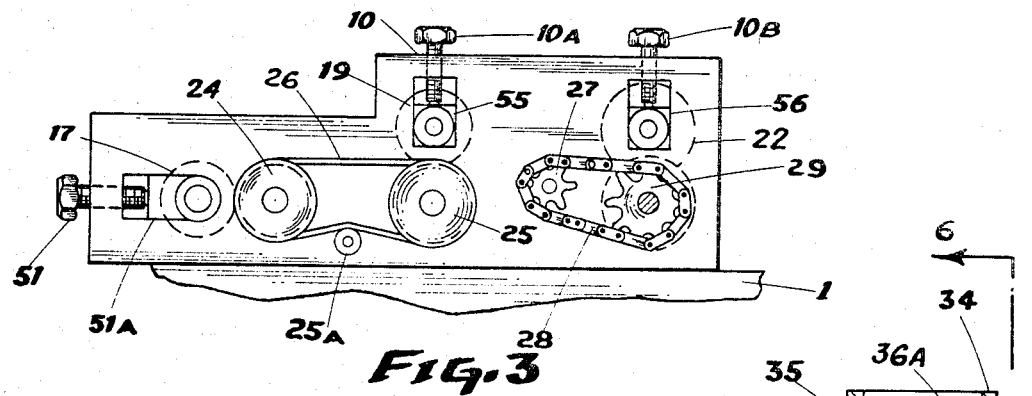
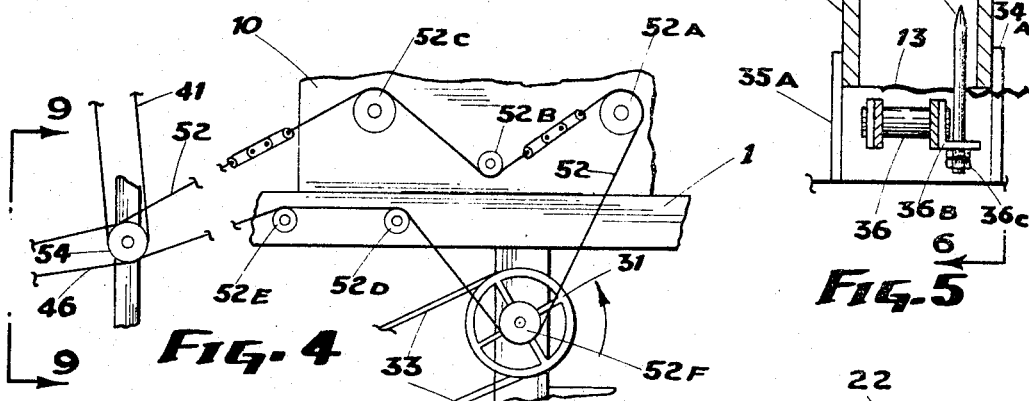
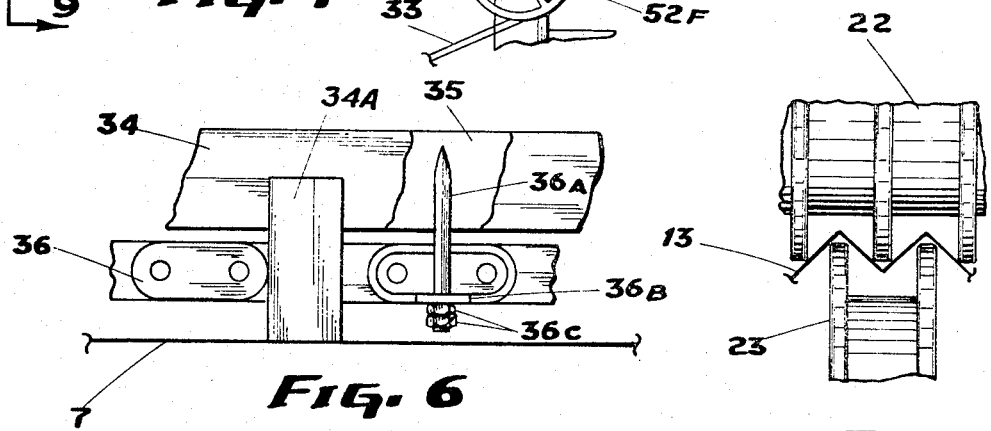
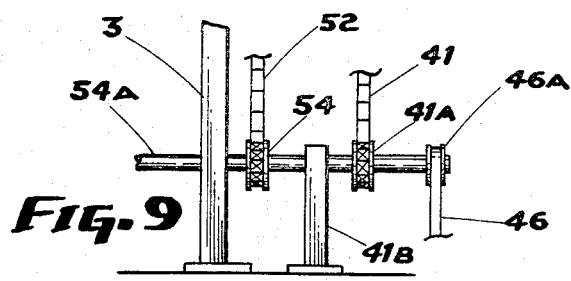

Oct. 4, 1966 G. P. McALEER ETAL 3,276,096
MATERIAL SLITTING AND EXPANDING MACHINE
Filed Nov. 25, 1964 3 Sheets-Sheet 3
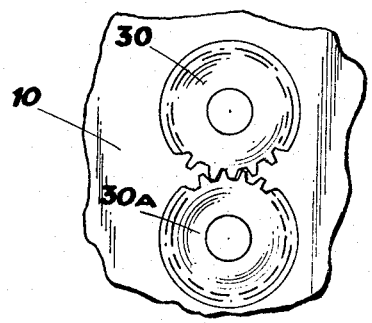
FIG. 8
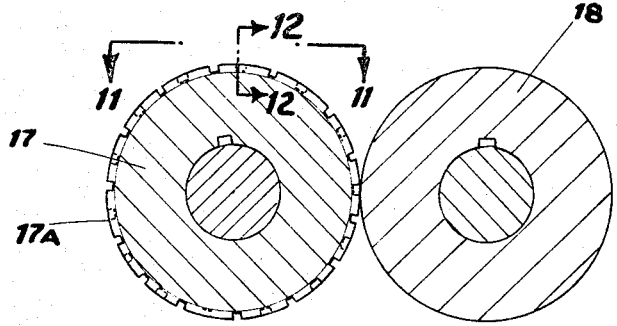
FIG. 10
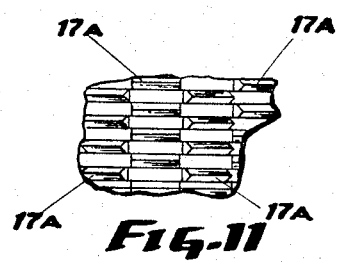
FIG. 11
FIG. 12
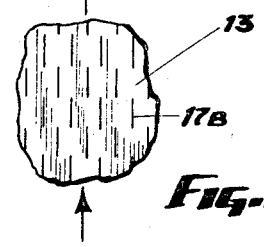
FIG. 13
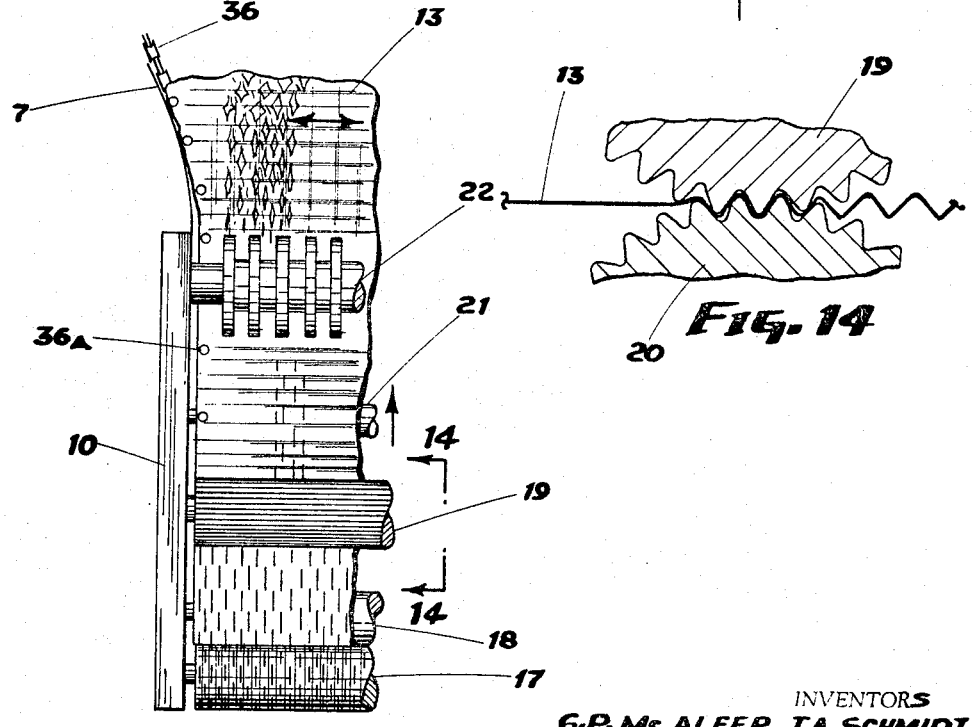
FIG. 14
FIG. 15
INVENTORS
G. P. McALEER, T. A. SCHMIDT
BY
Erwin A. Yaeger
ATTORNEY United States Patent Office 3,276,096
Patented Oct. 4, 1966

3,276,096
MATERIAL SLITTING AND EXPANDING MACHINE
George P. McAleer, 2649 NE. 11th Court, and Theodore A. Schmidt, 1820 NE. 41st St., both of Fort Lauderdale, Fla.
Filed Nov. 25, 1964, Ser. No. 413,702
9 Claims. (Cl. 29—6.1)

This invention relates to a machine or apparatus for slitting and expanding sheet material, such as relatively thin metal, paper, plastic or the like.

It is one of the objects of the invention to provide a machine of this kind which will rapidly, effectively and economically slit and expand a moving strip or web of the material, and which will also corrugate or otherwise produce a pattern in the shaping of the web.

It is an object of the invention to provide a machine in which in the operation of its elements there is no inertia to overcome as is experienced in machines which reciprocate or oscillate. The result is that with the present machine, wear and tear is greatly reduced.

It is another object of the invention to provide a slitting means in an apparatus of this kind in which long knife wear results because of a novel slitting arrangement.

It is an object of the invention to provide rotary cutters operating against a platen roll to provide for a slicing action resulting in a clean cut with no "shear-drag" as is often found in the piercing or guillotine shearing practices.

With these and other objects to be hereinafter set forth in view, we have devised the arrangement of parts to be described and more particularly pointed out in the claims appended hereto.

In the accompanying drawings, wherein an illustrative embodiment of the invention is disclosed, FIG. 1 is a top plan view of a machine or apparatus for slitting and expanding sheet material according to the present invention;

FIG. 3 is a view taken substantially on the line 3—3 of FIG. 1, looking in the direction of the arrows;

FIG. 4 is a view taken substantially on the line 4—4 of FIG. 1, looking in the direction of the arrows;

FIG. 5 is a view taken substantially on the line 5—5 of FIG. 1, looking in the direction of the arrows;

FIG. 6 is a view taken substantially on the line 6—6 of FIG. 5, looking in the direction of the arrows;

FIG. 7 is a view taken on the line 7—7 of FIG. 1, looking in the direction of the arrows;

FIG. 8 is a view taken substantially on the line 8—8 of FIG. 1, looking in the direction of the arrows;

FIG. 9 is a view taken substantially on the line 9—9 of FIG. 4, looking in the direction of the arrows;

FIG. 10 is a cross-sectional view through the slitting knife roll and the platen roll;

FIG. 11 is a portion of the surface of the slitting roll, the view being taken substantially on the line 11—11 of FIG. 10, looking in the direction of the arrows;

FIG. 12 is a view taken substantially on the line 12—12 of FIG. 10, looking in the direction of the arrows;

FIG. 13 shows a portion of the slit sheet material, showing how the slits are formed therein;

FIG. 14 shows the action of the corrugating or pattern-forming rolls on the sheet material, the view being taken substantially on the line 14—14 of FIG. 15, looking in the direction of the arrows, and FIG. 15 is a top plan view of a part of the machine.

Figure 1:
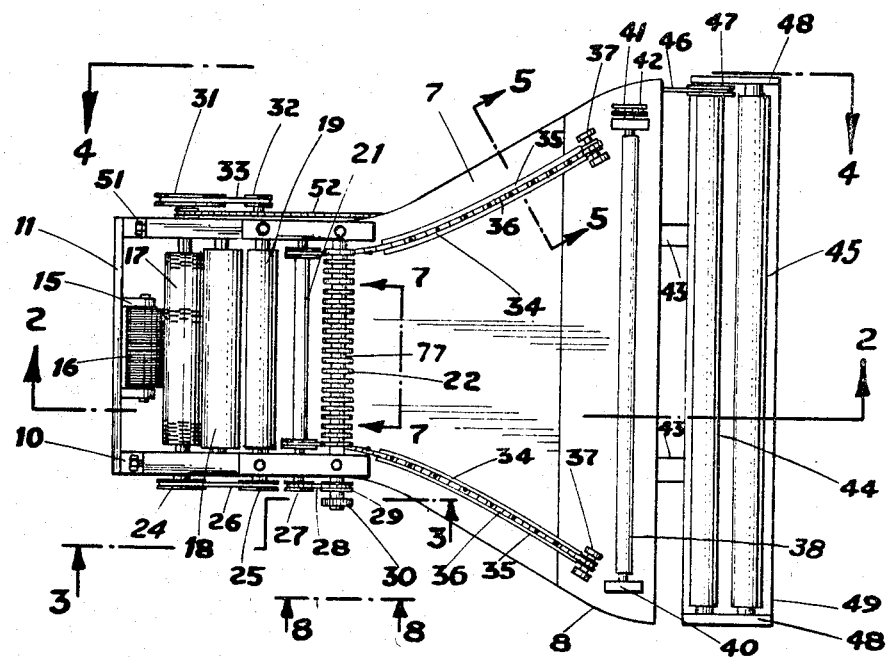
Figure 2:
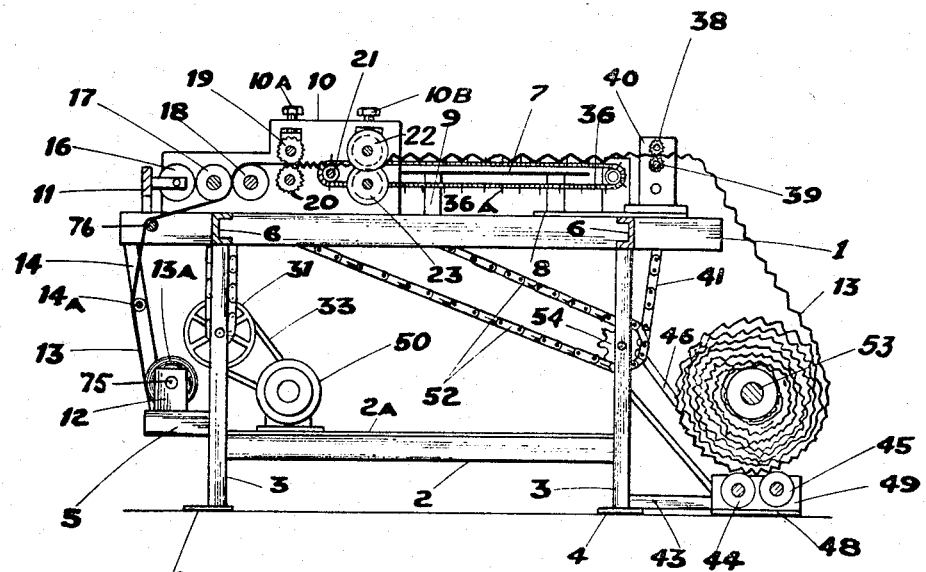
FIG. 2 is a sectional view of the same, taken substantially on the line 2—2 of FIG. 1, looking in the direction of the arrows.

The sheet material to be slit and expanded, and which is shown at 13 in the drawings, may be composed of relatively thin metal such as aluminum or brass, and such material in its slit and expanded form is often used as filtering material for liquids, air or gas. One of its important uses is as a filtering material for oil in refinery operation. The metals to be slit and expanded can have a thickness of from 1 to $10/1000$. While the apparatus to be described is primarily intended for the slitting and expansion of metal it can be used for slitting paper, plastic and possibly other materials. When it is used for metal as above pointed out, a preferred thickness for such metal is usually on the order of 3 to $4/1000$.

The material to be slit and expanded may be in the form of a lengthy strip or web in roll form as seen at 13A and from which it is drawn upwardly to reach the elements of the machine which operate upon it. The roll or sheet material is mounted on a spindle 75 supported in the brackets 12. Mounted on the extended platform 5 of the frame of the machine and braced by the members 14 are the brackets 12. The frame of the machine includes upstanding legs 3 having feet 4 and connected near the bottom by the longitudinal braces 2. At the top the frame includes longitudinal bars 1 connected by cross members 6.

The sheet material 13, drawn from the supply roll 13A, extends upwardly, passing over guide rollers 14A and 76 and then passing between a rotary slitting knife 17 and a platen roller 18. The rotary knife 17 is shown in detail in FIGS. 10 to 12 wherein it will be seen that the same is provided on its periphery with cutting blades 17A which slit the material to produce therein a series of interrupted slit openings 17B with such openings in one row staggered in relation to those in an adjacent row as clearly seen in FIG. 10.

The slitting knives 17B are flat circular discs, the outside diameters of which are ground to a knife edge as seen in FIG. 12. At intervals about the outside diameter, gaps are produced in each knife edge. The spacing and dimensions of the gap determines the length of each of the slits 17B formed in the material. The knives are mounted on a shaft and securely held in place by a key; the shaft being mounted in roller bearings. The spacing between the knife edges determines the width of the material between the rows of slits.

The platen roll 18 which mates with the slitting knives is made of brass or soft steel into which the knife edges can cut mating grooves, insuring correct contact and compensating for slight differences in the outside diameters of the slitting knives. The bearings which support the platen roll 18 are provided with guides which bear against ground surfaces on a bed plate. This arrangement is desirable since the platen is adjustable in relation to the knives by means of the elements 10 and 51 so that the amount of pressure between the knives and the platen roll can be controlled and at the same time maintain the alignment. After the necessary "running-in" during which time grooves are cut into the platen roll 18, the platen roll is adjusted away from the knives to the extent that the edges of the knives do not bear against the bottoms of the grooves that have been formed in the platen roll. During the slitting of the material, the material is drawn tightly around the platen roll 18 so that the knife edges penetrate the material without pinching it against the bottom of the grooves in the platen. As a result the sharp cutting edge of each of the knives is maintained for a substantial period.

The material 13, slit as above described, passes between a pair of pattern rolls 19 and 20 which as illustrated, are ribbed in the manner shown in FIG. 14 and which form corrugations in the material, with such corrugations extending transversely of the length of the web of material.

These pattern rolls 19 and 20 consists of a pair of rolls which by their peripheral shaping can form the web into any desired shape. The corrugations shown are illustrative of one of the shapes into which the separating webs between the slits may be formed. The function of these pattern rolls is to divide in any desired manner, these straight webs of the material between the slits. The rolls 19 and 20 are mounted one above the other, the bearings 55 of the top roll being adjustable by screw 19A so that the degree of contact between the rolls can be controlled. As the slit material is passed between these rolls it is permanently bent or shaped with the pattern of the rolls.

When the shaped or corrugated material leaves the pattern rolls 19 and 20 it is engaged by pins 36A attached to angle brackets 36B by means of nuts 36c. The pins 36A, clearly shown in FIGS. 5 and 6, engage in the slits formed in the material, after such slits have been expanded or opened slightly, as will be explained. The slits located adjacent to the longitudinal side edges of the web 13 are those engaged by the pins 36A. The angle brackets 36B to which the pins are attached are secured to endless chains 36.

As will be seen in FIG. 1 the two chains 36 progress divergently away from their left ends. For a distance of about 25 percent of their length, the chains operate parallel to one another. This area constitutes a "throat" section of these expansion chains and located in this area is a rotating shaft 77 carrying a plurality of discs 22 having peripheral parts which enter into and partially open the slits 17B in the web 13. Discs 22 on the shaft 77 co-operates with a lower set of discs 23 in the manner shown in FIG. 7 to give the desired opening to the slits in the web. Shaft 76 carrying the upper set of discs 22 is mounted in adjustable bearings 56, regulatable by means of the screws 10B. By regulating the spacing or vertical distance between the shafts of which the discs are respectively mounted, the degree of slit opening can be governed. As the chains diverge, they exert a transverse pull or lateral stretching action on the web, thus increasing the width of the web while enlarging the slits to openings.

The chains 36 are guided divergently as above explained by means of guides 34, 35 supported by the uprights 34A and 35A. At one end, the chains 36 pass around sprockets carried by the driven shaft 21, located directly after the pattern rolls 19 and 20. As the pins 36A secured to these chains turn about these sprockets they contact with and pick up the sheet material and enter into the slits therein. At their opposite ends the chains pass around sprockets on the shafts 37.

When the web of material reaches the desired degree of expansion by being transversely expanded by the pull exerted on it by the divergently-extending chains 36, the material leaves the chains and it is thereafter moved between a second set of pattern rolls, shown respectively at 38 and 39, rotatively mounted in the bearings 40, which act to restore the corrugations or other pattern initially produced by the rolls 19 and 20 and which may have become distorted during the expansion of the material by the divergent portions of the chains.

At 50 is shown the operating motor of the machine, the same being mounted in the lower portion of the frame, and it carries a pulley 32 engaging a belt 33 which extends around a pulley 31. On the shaft that carries the pulley 31 is a sprocket 52F (FIG. 4) engaged by a chain 52 which passes around a sprocket 52A on a shaft carrying a roller 16 which is rotative in bearings 15 and which constitutes a back-up roll for the knife 17. The chain 52 then extends under sprocket 52B carried on the shaft which supports the slitting roll 20. The chain then extends over sprocket 52C which is located on the shaft which bears the slit-enlarging roll 23. The chain then proceeds to pass around a sprocket 54 located near one end of the machine frame. Said sprocket 54 is mounted on a shaft 54A (FIG. 9) and which shaft carries a sprocket 41A engaged by a chain 41 which extends to sprocket 42 carried on the shaft which bears the final pattern roll 39. The lower stretch of the chain 52 passes over idler rollers 52E and 52D. The shaft 54A carries a pulley 46A engaged by a belt 46 which extends to a pulley 47 on a shaft carrying a roller 44 which in co-operation with a companion roller 45 constitutes take-up means for the slit and expanded web that is wound up on a spindle 53. The rollers 44 and 45 are rotatively mounted in upstanding parts 49 of a bracket 48 supported by bars 43 extending from the machine frame.

As will be seen in FIG. 8, the shafts of the pattern rolls 22 and 23 respectively carry intermeshed gears 30 and 30A whereby the rolls 22 and 23 are driven at the same speed and in the required opposite directions. The shaft 21, constituting the drive shaft for the chains 36, is provided at one end with a sprocket 27, engaged by a chain 28 (FIG. 3) which extends around a sprocket 29 mounted on the shaft which carries the slit-enlarging roller 23. The shaft for the lower pattern roller 20 is provided at one end with a pulley 25 engaged by a belt 26 which passes about a pulley 24 carried by the shaft on which the lower slitting roller 20 is mounted. The belt 16 extends over idler 25A.

The drive arrangement for the various rotative parts of the machine are arranged to drive all such parts in the required direction and at the proper speeds.

From the foregoing, the operation of the improved slitting and expanding device will be readily apparent. The web of the material 13, drawn from the supply roll 13A passes between the slitter 17 and platen 18 where the slits are formed in the manner heretofore described. The slit material then passes between the pattern rolls 19 and 20 to be corrugated or otherwise shaped. The material, then engaged by the pins 36A is then moved between the slit-enlarging rolls 22 and 23 by which the slits are slightly enlarged. The material then passes into the diverging parts of the chains which stretch or expand the material laterally to the required width. Thereafter the material passes between the final pattern rolls 38 and 39 by which any deformation in the pattern is eliminated and the uniform pattern restored. From the final pattern rollers the then expanded and slit web is rolled up on the spindle 53.

Having thus described a single embodiment of the invention, it is obvious that the same is not to be restricted thereto, but is broad enough to cover all structures coming within the scope of the annexed claims.

What we claim is:

1. A slitting and expanding apparatus for sheet material comprising, a rotating slitter operative against a traveling web of the material to produce lines of interrupted slits therein, deforming means operative on the slit web to deform the web, means entrant into the slits to enlarge the same, and means engaging the traveling web adjacent its side edges and moving divergently to stretch the web transversely and increase the effective width of the same while enlarging the openings therein.

2. A slitting and expanding apparatus according to claim 1, wherein the rotating cutter has a series of discs having interrupted cutting edges, a platen roller against which said discs peripherally operate, and the divergent means for expanding the sheet material being chains extending divergently in the direction of travel of the web of material.

3. A slitting and expanding apparatus for a web of relatively thin sheet material comprising, a rotating knife consisting of spaced discs having interrupted knife edges, a platen roll against which said edges are operative with the web moved between the knife and platen roll, a pair of platen rolls between which the web is moved after having been slit and which deform the web, a pair of cooperating rolls having parts which enter the slits and enlarge the same, a pair of divergently-extending endless chains having protecting pins which enter the slits in the web adjacent to the side edges of the web and move the web longitudinally while stretching it transversely, and a second pair of pattern rolls between which the web is moved to uniformly restore its deformation after having been stretched or expanded.

4. A slitting and expanding apparatus for sheet material having a pair of endless chains in spaced apart relation, each of said chains having projecting pins, said pins enter apertures in a web of the material and moving the material, the chains gradually diverging from one another in the direction of travel of the sheet material whereby the sheet material will be stretched transverse to the direction of travel of the web by the divergence of the chains.

5. A slitting and expanding apparatus for sheet material comprising, a cutting roller consisting of a plurality of knife-edged discs mounted in spaced relation on a shaft, a platen roller against which the edges of the discs are operative, the web or material to be slit being moved between the cutting roller and the platen roller, a pair of corrugating rollers between which the web is moved after having been slit, a pair of slit-enlarging rollers between which the web is moved after having been corrugated, a pair of spaced-apart divergent chains having pins engaging in the slits in the web and moving the web, the chains having an entering portion where the same are in parallelism and then diverge from said portion to thereby laterally expand the web, and a pair of corrugating rollers between which the web enters after the same has been expanded by the action of the diverging portions of the chains.

6. A slitting and expanding apparatus for sheet material according to claim 5, and including a spindle on which the expanded web is wound and rollers engaging the rolled-up web to effect the winding of the same on the spindle.

7. A slitting and expanding apparatus for sheet material comprising, a rotary slitter for producing rows of interrupted slits in a web of sheet material, means for crimping the web after having been slit, means entering the slits to enlarge the same, and divergent traveling elements engaging the web adjacent its side edges and expanding the same.

8. A slitting and expanding apparatus according to claim 7, wherein the traveling elements are chains and are provided with pins entering the slits in the web near its side edges, and including means for re-crimping the web after it has been expanded.

9. A slitting and expanding apparatus according to claim 8, wherein the chains have divergent parts extending through guides to maintain said divergent parts of the chains in their divergent relationship.

References Cited by the Examiner
UNITED STATES PATENTS

| | | | |
|---|---|---|---|
| 1,850,543 | 3/1932 | Gersman | 29—6.1 |
| 1,864,598 | 6/1932 | Kessler | 29—6.1 |
| 2,989,145 | 6/1961 | Goodloe | 29—6.1 |

RICHARD H. EANES, Jr., *Primary Examiner.*